United States Patent [19]
Tsuru et al.

[11] Patent Number: 5,600,390
[45] Date of Patent: Feb. 4, 1997

[54] ELECTRIC CAMERA

[75] Inventors: Hiroyuki Tsuru, Tokyo; Tadashi Otani, Ohtawara; Keishi Urata, Tokyo, all of Japan

[73] Assignee: Nikon Corporation, Tokyo, Japan

[21] Appl. No.: 494,246

[22] Filed: Jun. 23, 1995

[30] Foreign Application Priority Data

Aug. 4, 1994 [JP] Japan ................................ 6-202691

[51] Int. Cl.⁶ ............................... G03B 1/18; G03B 5/02
[52] U.S. Cl. .................. 396/133; 396/85; 396/349; 396/448
[58] Field of Search .......................... 354/195.1, 195.12, 354/190, 289.1

[56] References Cited

U.S. PATENT DOCUMENTS 4,200,378  4/1980  Shenk.
5,367,354  11/1994  Kawasaki et al. ................... 354/400

*Primary Examiner*—Safet Metjahic
*Assistant Examiner*—Matthew Miller

[57] ABSTRACT

There is disclosed an electric camera which comprises a switch for switching a state of the camera between a state out of use and a state in use, a driving member for shifting the position of a member to be driven to change its state between a state out of use and a state in use in accordance with the state switched by the switch, detection unit for detecting whether the member to be driven is shifted during an operation of the driving member, counter unit for starting counting when the driving member is started to operate upon switching by the switch, change-over unit for changing over a driving speed of the driving member from a first speed to a second speed which is lower than the first speed, and control unit for stopping the drive of the driving member when the counter unit counts a predetermined time, so that the camera can be used continuously when the photographing lens or the barrier is stopped due to external forces, etc., and then the cause thereof is removed, and battery consumption can be suppressed to the minimum.

19 Claims, 7 Drawing Sheets

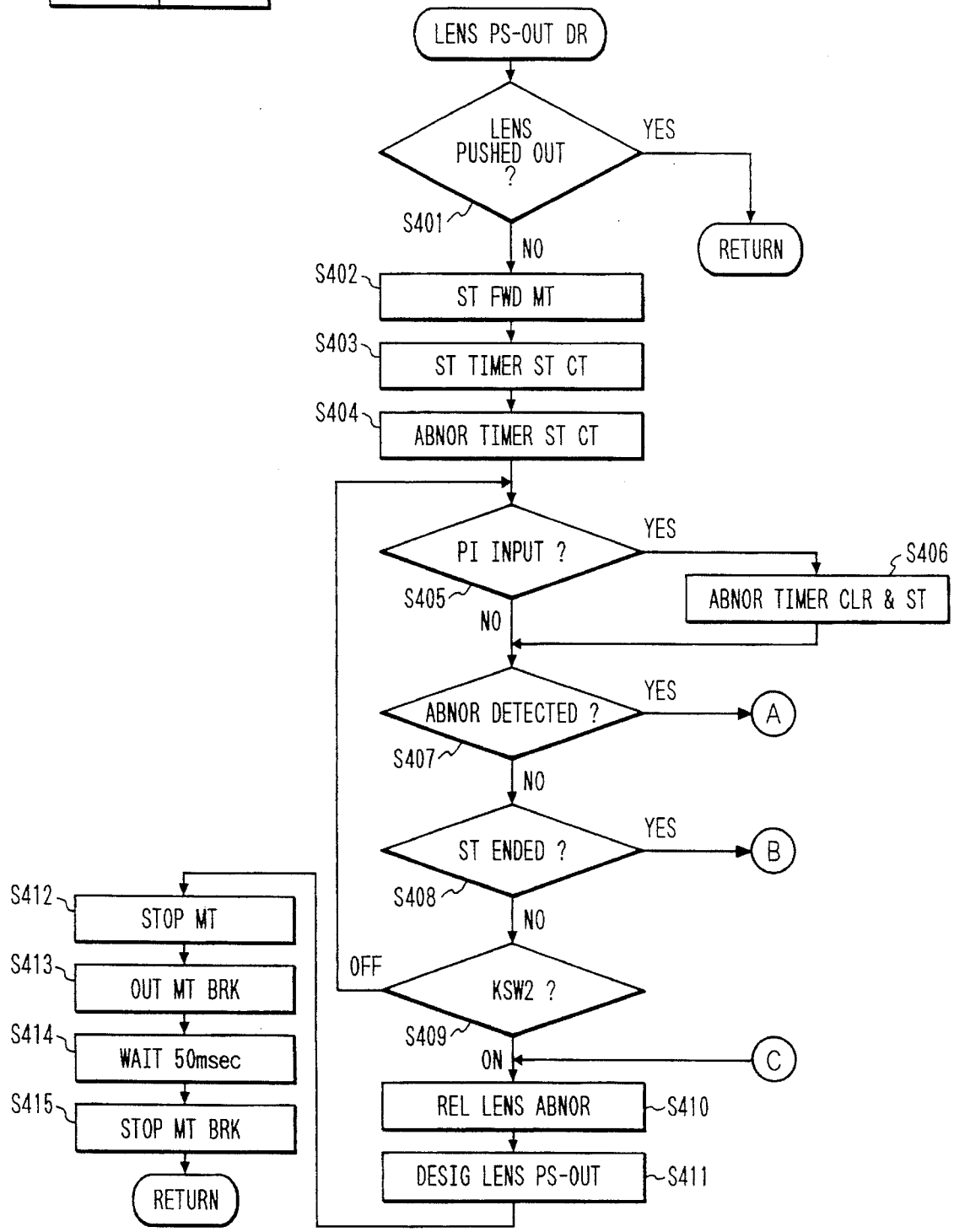

ELECTRIC CAMERA

BACKGROUND OF THE INVENTION

1. Field of the Invention

The present invention relates to an electric camera which shifts a photographing lens of the camera or a barrier for protecting the photographing lens to change its state between a state in use and a state out of use.

2. Related Background Art

Hitherto, there has been proposed a camera for preventing, when a photographing lens is halted by an unexpected external force or the like during a movement of the photographing lens, damage of a lens driving mechanism or damage by a burning of a driving circuit which may occur when the driving operation is continued by detecting the halt and stopping energization of the motor. There has been also proposed a camera in which the control on the lens drive is switched into control by pulse energization when an abnormality is detected so as to return the control. Further, the control in the same manner is effected for a barrier for protecting the photographing lens.

However, if the energization of the motor is halted when an abnormality occurs, the photographing lens or the barrier remains halted, and even if the external force or the like which causes the abnormality is removed, it is feared that the camera can not be used until the user executes some returning operation.

When an abnormality such as an idling of a driving gear caused by damage of the gear occurs, a drive of the motor by the pulse energization is continued unless the user executes some operation so that the battery power is exhausted.

SUMMARY OF THE INVENTION

An object of the present invention is to provide an electric camera which can be used continuously even when a photographing lens or a barrier has been halted by an unexpected force or the like, but the cause for the halt is removed and which can suppress consumption of the battery power to the minimum at the same time.

An electric camera of the present invention is provided with a switch for switching a state of the camera between a state out of use and a state in use, a driving member for shifting the position of a member to be driven to change its state between a state out of use and a state in use in accordance with the state switched by the switch, detection means for detecting whether the member to be driven is shifted during an operation of the driving member, counter means for starting counting when the driving member is started to operate upon switching by the switch, change-over means for changing over a driving speed of the driving member from a first speed to a second speed which is lower than the first speed, and control means for stopping the drive of the driving member when the counter means counts a predetermined time.

In the electric camera having the above-mentioned structure, when an abnormal state in the drive of the lens or the barrier is detected, the drive control is changed over to the control by pulse energization so that a load due to the drive is lowered and the drive of the driving member can be continued while damage of the driving mechanism or damage by a burning of the driving circuit can be prevented. Also, since a movement of the lens is detected continuously after a start of the drive control by the pulse energization, if the lens is moved after the detection of the abnormality to reach a target position, a desired operation can be continued.

Furthermore, after the predetermined time has elapsed since a start of the operation of the driving member, the pulse energization is halted and the power is turned down so that consumption of the battery power can be saved to the minimum even if the user is not aware of an outbreak of the abnormality.

DESCRIPTION OF THE PREFERRED EMBODIMENTS

An embodiment of the present invention will be described below with reference to the attached drawings.

Figure 1:
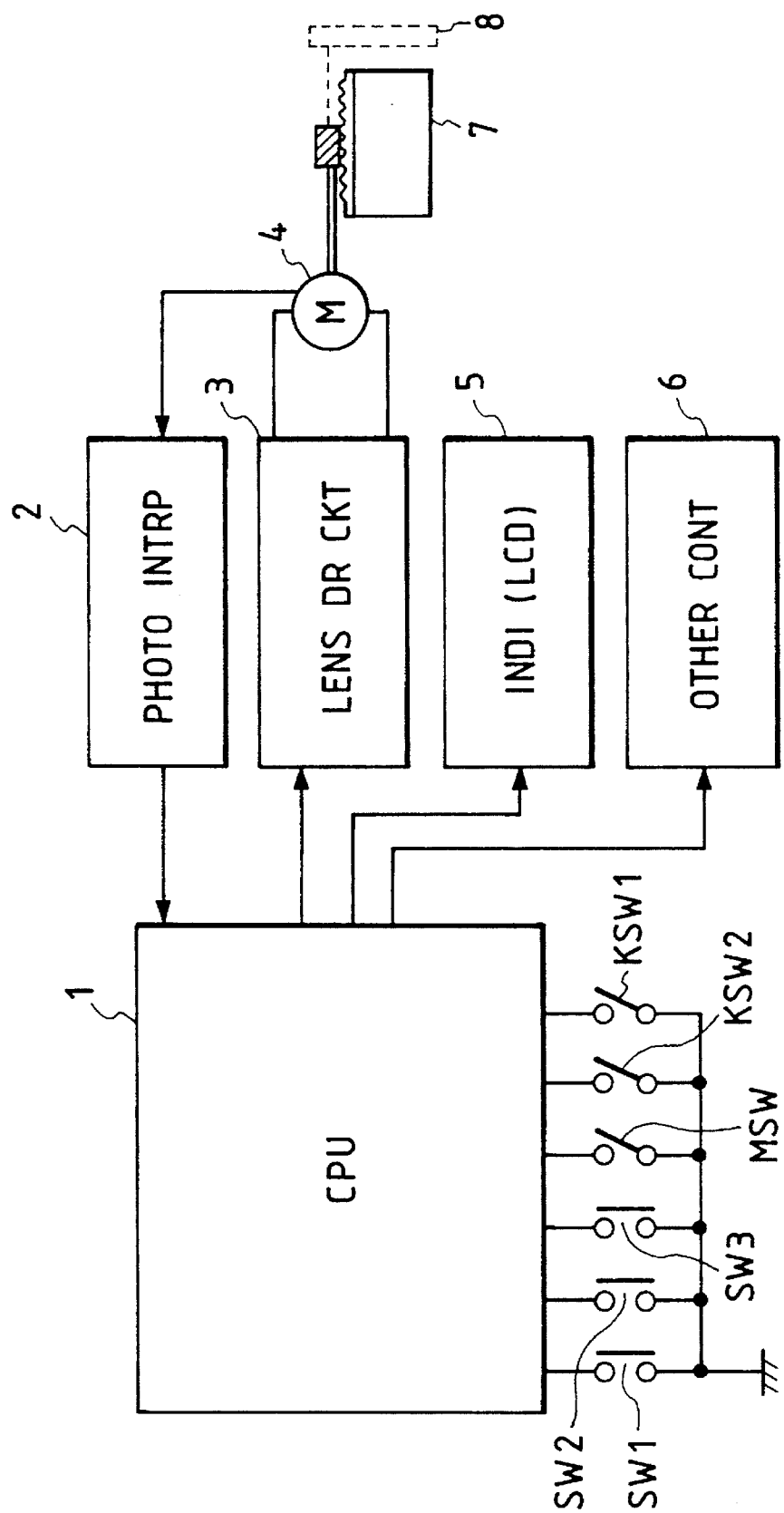
FIG. 1 is a block diagram showing an embodiment of an electric camera according to the present invention.

FIG. 1 is a block diagram showing an embodiment of an electric camera according to the present invention.

Referring to FIG. 1, a central processing unit 1 executes all control processings and is referred to as the "CPU1" hereinafter. A photo-interrupter 2 intermittently shields light beams by use of a movable light-shielding plate (not shown) and detects the light beams which pass through the plate so as to generate a pulse synchronously with a rotation of a motor 4 or a movement of a lens. A lens driving circuit 3 drives a photographing lens by controlling the motor 4 for driving the lens. The lens driving motor 4 shifts the photographing lens of collapsible type into a photographing state (extended state) or a collapsed state. A display device 5 such as an LCD (liquid crystal device) or the like normally displays a mode of the camera or a state of a film counter. A control unit 6 represents camera controllers such as photometer or distance measurement device which are not directly related to the present invention. The photographing lens 7 and a barrier 8 are to be driven by the motor 4.

A KSW1 is a switch which is turned on (or off) when the photographing lens 7 is in the collapsed state. A KSW2 is a switch which is turned on (or off) when the photographing lens 7 is in the photographing-lens-extended state which is a position of the camera when it is in the state of use. An MSW is a switch which is operated by the user and is turned on when the user sets the camera in the state in use and off when the user sets the camera in the state out of use.

An SW1 functions as a switch for releasing a control by pulse energization when an abnormal lens drive occurs and functions normally as an operating switch concerning the camera control. An SW2 functions as an operating switch for resuming a shifting operation after a halt of the lens shift when an abnormal lens drive breaks out, and normally functions as an operating switch concerning the camera control. An SW3 is a representative switch for other camera operations and symbolizes a switch group having the number of switches corresponding to the number of functions of the camera.

Figure 2A:
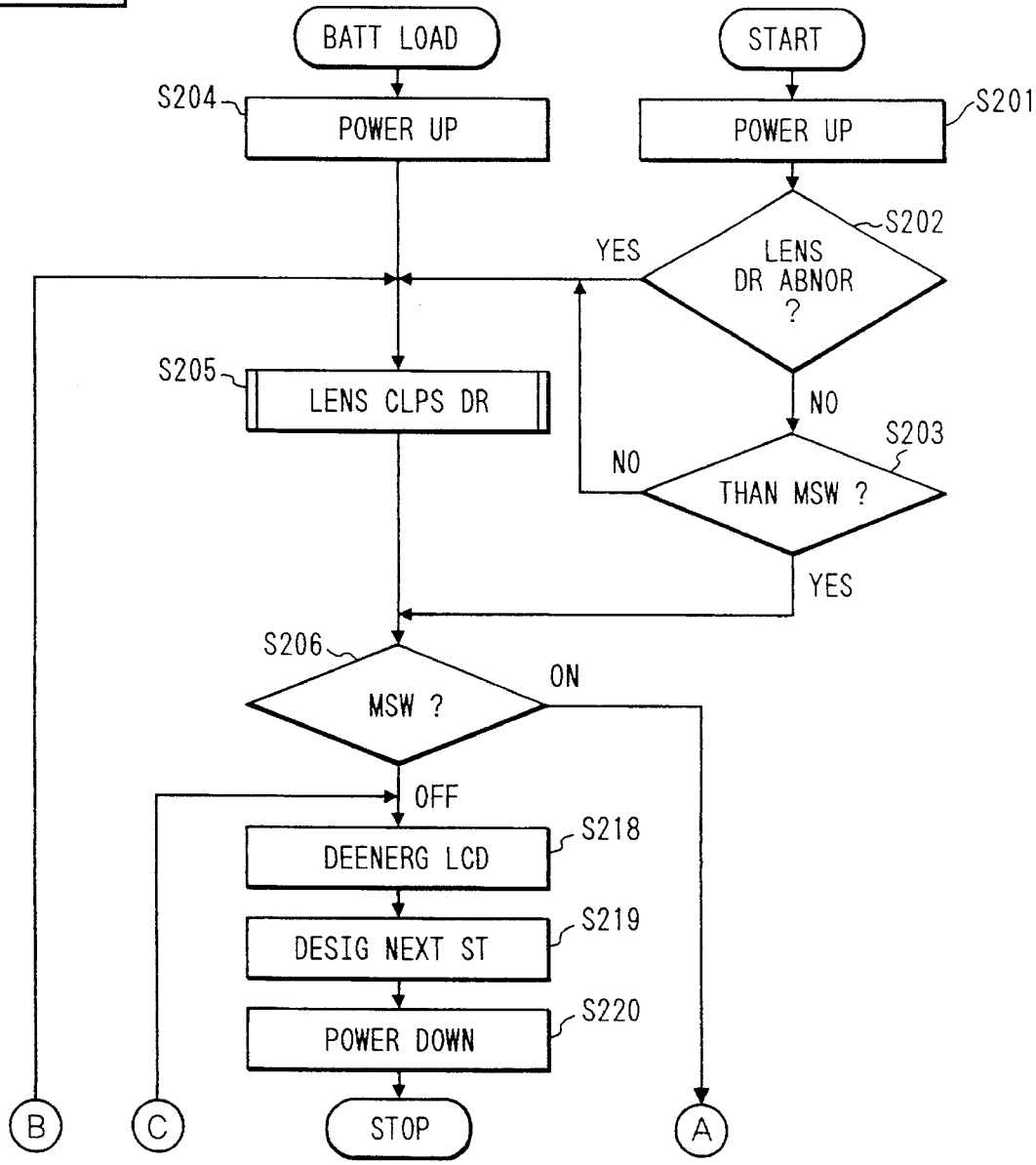
FIG. 2 is comprised of FIGS. 2A and 2B showing flow charts illustrating a sequence in the embodiment of the electric camera according to the present invention.
Figure 2B:
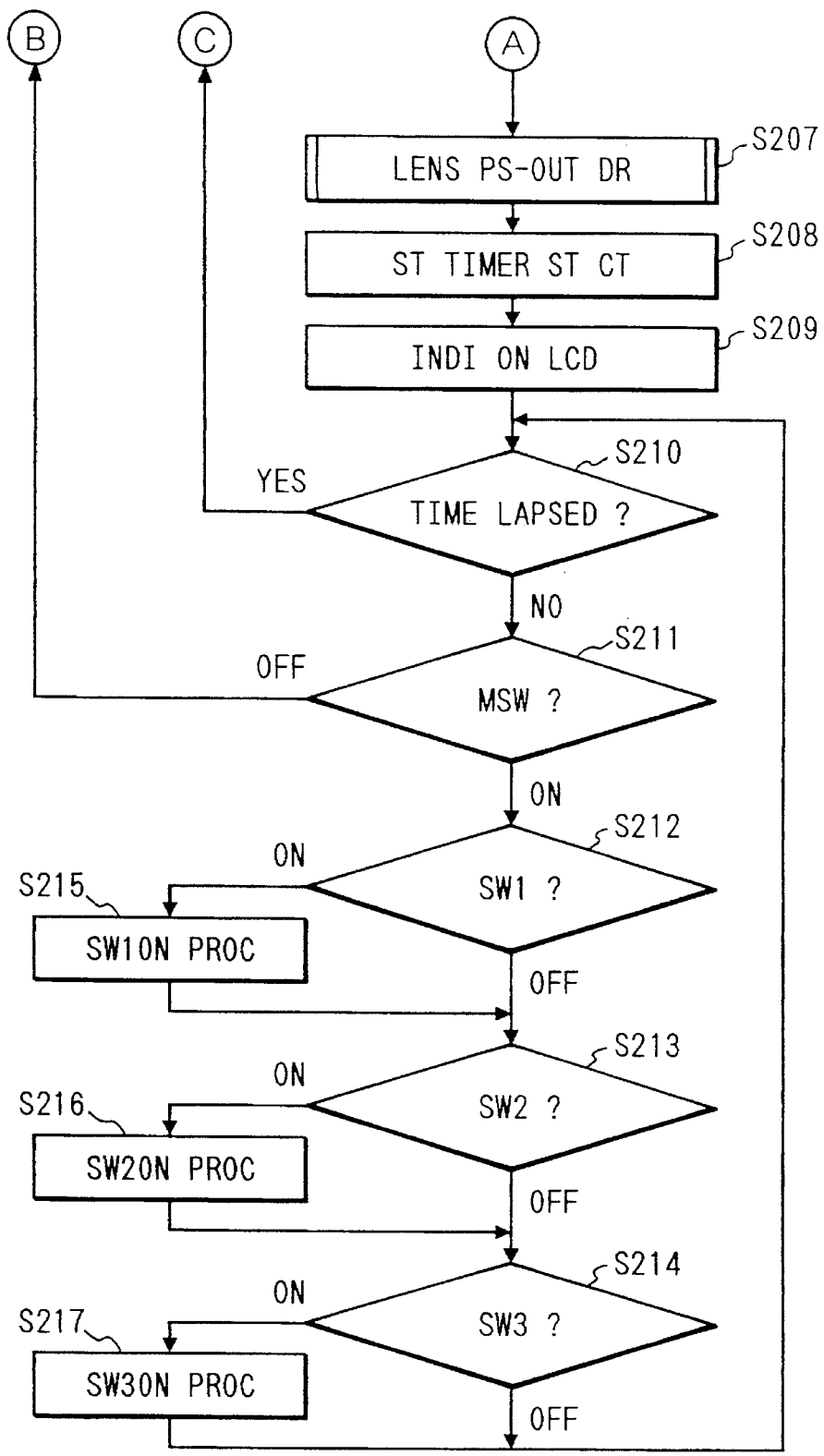

FIGS. 2A and 2B are flow charts showing a control sequence of the CPU1.

After being started, the CPU1 executes a power-up processing in step S201. The power-up processing includes a control to turn on a DC-DC converter and a control to change over a control clock from a low speed to a high speed. The CPU1 operates with a low voltage at the time of low-speed control and requires a high voltage at the time of high-speed control. Thus, the voltage supplied to the CPU1 is changed over from a low voltage to a high voltage in step S201. Note that this power-up processing is the processing reverse to a power-down processing in step S220.

In step S202, whether the lens drive is abnormal or not is checked. The lens drive abnormality includes a halt of the motor 4 for a predetermined time or more or a halt of the photographing lens 7 for a predetermined time or more. Whether the lens drive is abnormal or not is checked based on a state of a flag to be set in step S324 (FIG. 3B) or step S424 (FIG. 4B). If Yes, the flow advances to step S205, and if No, the flow advances to step S203. In step S203, whether the start is caused by a reversal of the MSW or not is checked. If Yes, the flow advances to step S205. If the start is caused by any of the switches (SW1 to SW3) to be designated in step S219, the flow advances to step S206.

In a normal CPU control system, the system may be reset when a battery is loaded (batteries are exchanged) (this reset is generally called as a power-on reset), or the system may be reset synchronously with a switch for closing a battery cover of the camera. It is called as the step of "battery loading" which starts execution when a battery is loaded (batteries are exchanged) and then the CPU1 is reset. When the CPU1 is started from this "battery loading" step, the processing is started from step S204. In step S204, an initial setting required for the control by the CPU1 and the power-up processing of the camera system are executed. At the initial setting, a stack pointer for subroutine management of the CPU1 may be initialized, or a value on a RAM of the CPU1 may be initialized. When the CPU1 is started from the "battery loading" step, the flow immediately goes from step S204 to step S205.

Figure 3A:
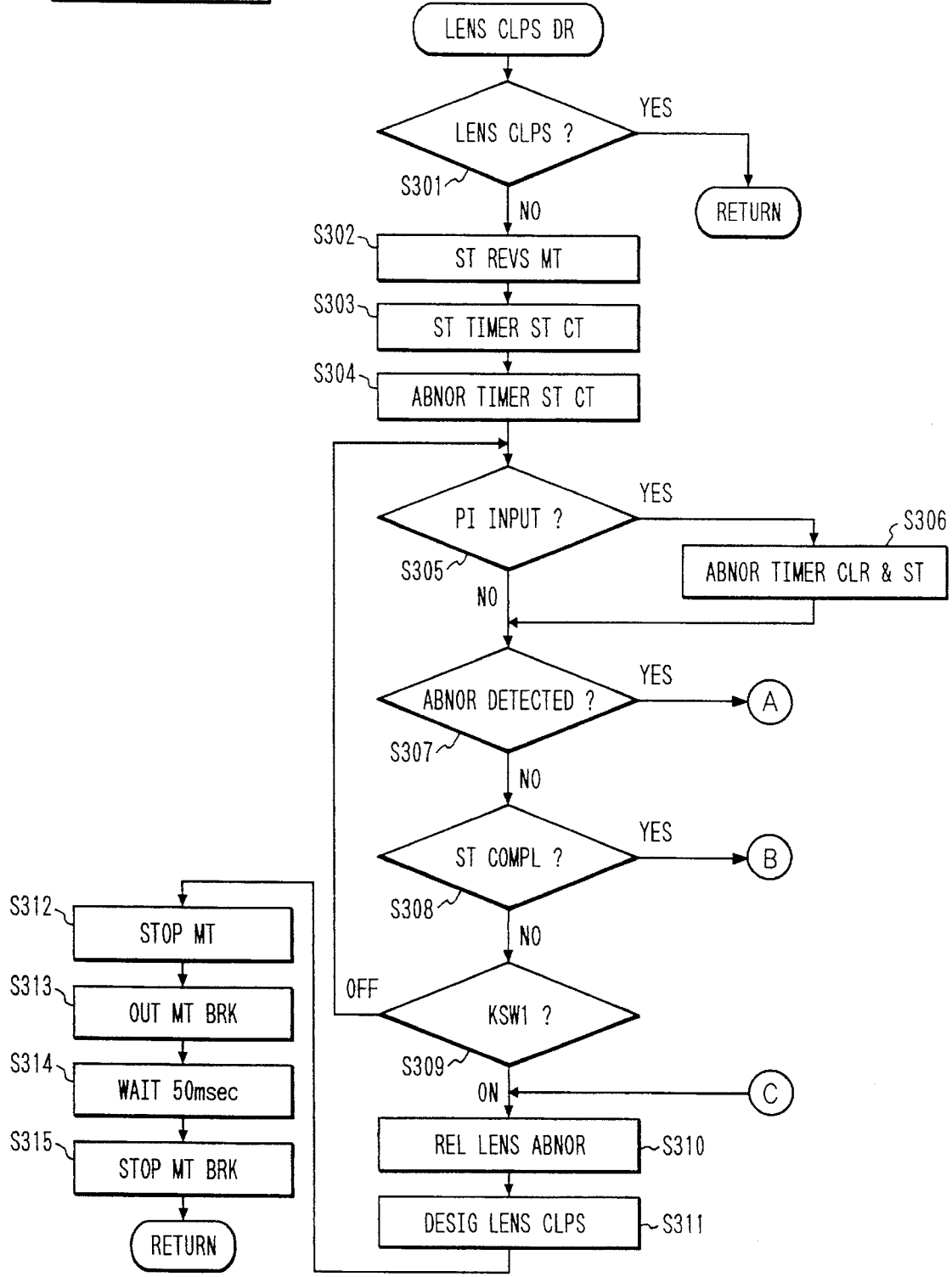
FIG. 3 is comprised of FIGS. 3A and 3B showing flow charts illustrating lens collapse control in the embodiment of the electric camera according to the present invention.
Figure 3B:
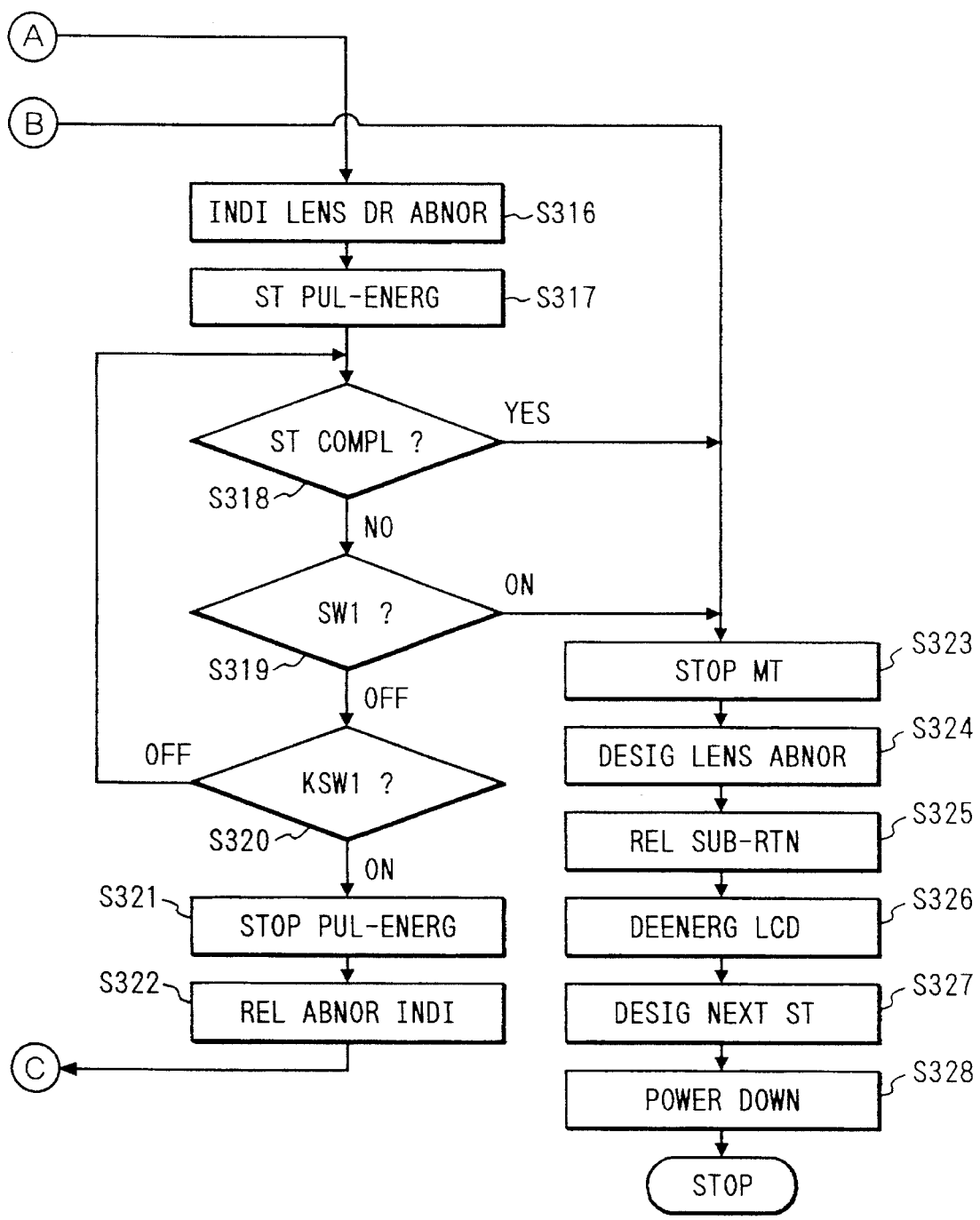
Figure 4B:
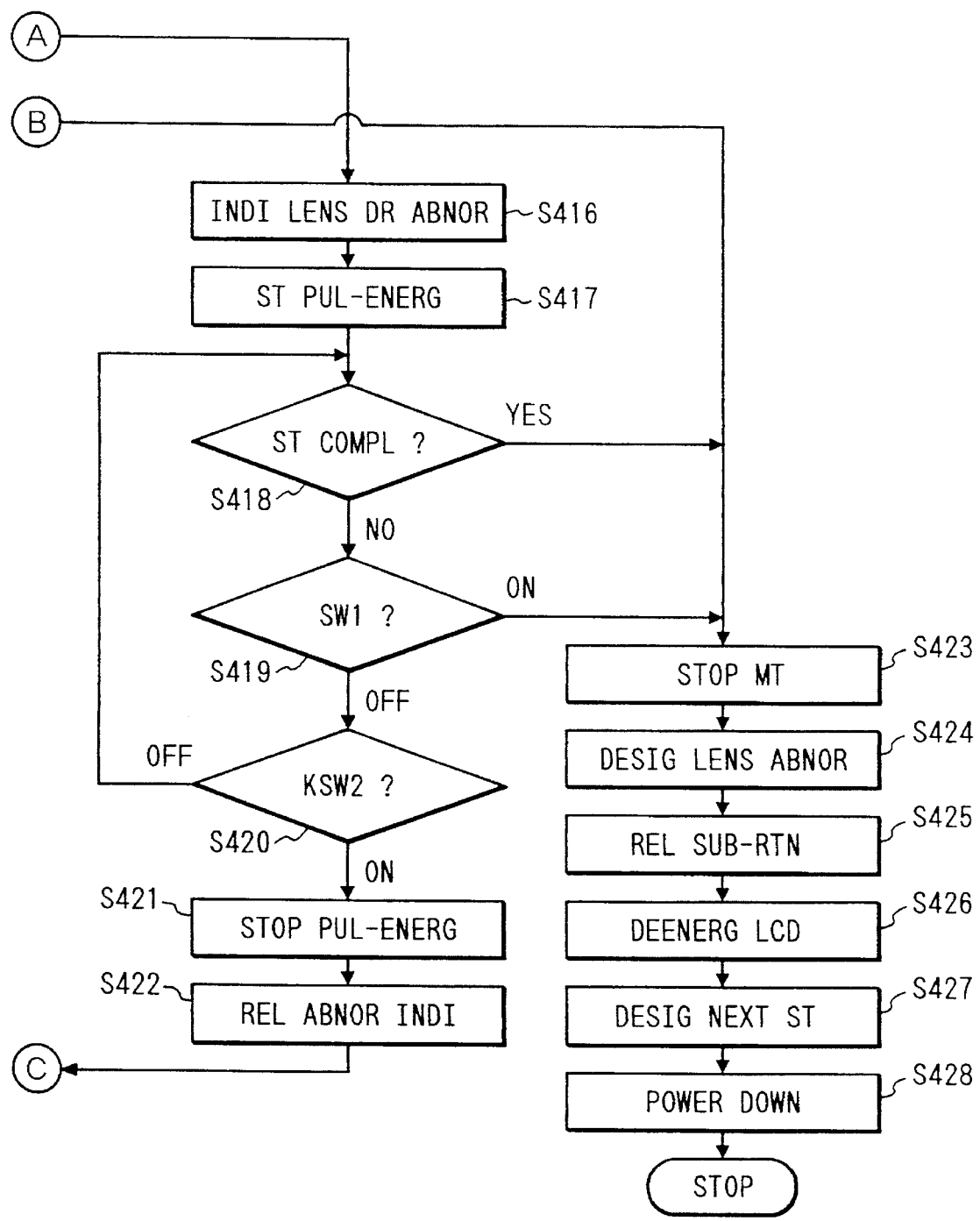
FIG. 4 is comprised of FIGS. 4A and 4B showing flow charts illustrating lens extension control in the embodiment of the electric camera according to the present invention.

In step S205, a "lens collapse drive" shown in FIGS. 3A and 3B is executed. Note that the above-mentioned "lens collapse drive" is executed as a subroutine. In step S206, a state of the MSW is checked. If the MSW is on, the flow advances to the step S207, and if the MSW is off, the flow advances to step S218 (to be described later).

In step S207, the "lens extension drive" shown in FIGS. 4A and 4B is executed. Note that the above-mentioned "lens extension drive" is executed as a subroutine. In step S208, a count by a start timer is started. A count time of the start timer is set, for example, for 4 seconds. The start timer may be set in a non-volatile memory (EEPROM) capable of storing data even if a battery is unloaded therefrom.

In step S209, camera information such as a film counter is displayed on the display device 5. In step S210, whether the count time set in step S208 has been elapsed or not is checked. If Yes, the flow advances to step S218, and if No, the flow advances to step S211. In step S211, a state of the MSW is checked. If the MSW is on, the flow advances to step S212, and if it is off, the flow returns to step S205. If the MSW is operated, the lens collapse drive is executed. Even if the MSW is turned on during the lens collapse drive, there arises no problem because the state check was executed in step S206.

In step S212, a state of the SW1 is checked. If the SW1 is on, the flow advances to step S215, and if it is off, the flow advances to step S213. In step S215, a processing of the camera corresponding to the operation of the SW is executed. Upon completion of the processing, the flow advances to step S213. The SW1 functions as a switch for releasing the control by pulse energization when the lens drive abnormality occurs, and functions as an operating switch concerning the camera control normally.

In step S213, a state of the SW2 is checked. If it is on, the flow advances to step S216, and if it is off, the flow advances to step S214. In step S216, the processing of the camera corresponding to the operation of the SW2 is executed. Upon completion of the execution, the flow returns to step S214. The SW2 functions as an operating switch for resuming a shift operation after a halt of the lens shift when the lens drive abnormality occurs, and functions as an operating switch concerning the camera control normally.

In step S214, a state of the SW3 is checked. If it is on, the flow advances to step S217, and if it is off, the flow returns to step S210. In step S217, the processing of the camera corresponding to the operation of the SW2 is executed. Upon completion of the processing, the flow returns to step S210. The processing of the camera corresponding to the operation of the SW3 includes, for example, a processing of photometry or distant-measurement for preparing photographing, or a processing for zooming up/down in case of a zoom-lens camera, or a processing of taking up a film, or the like.

A state of the MSW is checked in step S206. If the MSW is off, the flow advances to step S218. If it is found in step S210 that the count time set in step S208 has been elapsed, the flow advances to step S218. In step S218, the display on the display device 5 given in step S209 is cleared off. However, if the CPU1 is capable of energizing the display device 5 even after the power is turned down, the display device 5 may remain energized.

The next start is designated in step S219. This designation is effected in response to the next energization of the SW1. However, the next start may be designated to be effected when a state of the MSW is reversed. It may be also designated to be effected when the SW2 or the SW3 is turned on.

The power-down processing, that is, the reverse processing described in step S204, is executed in step S220. After that, the CPU1 is stopped by "STOP". It is when a condition designated in step S219 is created that the next start is effected. Upon creation of the condition, the processing is resumed from the "start" step.

FIGS. 3A and 3B are flow charts showing the lens collapse drive (step S205) routine.

In step S301, whether the photographing lens 7 is in the collapsed state or not. If Yes, the flow goes to step S206 (FIG. 2A) by use of "RETURN". It is designated in step S311 to set the photographing lens 7 in the collapsed state and this state is released by the lens extension designation in step S411 (FIG. 4A).

In step S302, a reverse rotation of the motor 4 is set in the lens driving circuit 3 so as to start driving the photographing lens 7 toward the collapse direction by a reverse rotation of the motor 4. The start timer starts counting in step S303, and in step S304 an abnormality detection timer starts counting. In step S305, it is checked whether there is any signal supplied from the photo-interrupter 2. If Yes, the count of the abnormality detection timer is cleared off in step S306 to resume the counting. If the motor 4 is rotated or the photographing lens 7 is moved, a pulse signal is generated from the photo-interrupter 2. Therefore, so long as the motor 4 is rotating or the photographing lens 7 is shifting, the count of the abnormality detection timer is continuously cleared off so that no abnormality is detected. However, if the motor 4 is halted or the photographing lens 7 is stopped, the pulse is not supplied so that the abnormality detection timer is not cleared off. Then, the flow advances to step S307.

In step S307, it is judged to be abnormal when the count time by the abnormality detection timer exceeds a predetermined value, and the flow advances to the step S316 (to be described later). When the abnormality is not detected, the flow advances to step S308.

In step S308, it is checked whether the start timer which starts the counting in step S303 reaches the predetermined time. If the predetermined time has been elapsed, the flow advances to step S323 (to be described later), and if not, the flow advances to step S309.

In step S309, a state of the KSW1 is checked, and the processings from step S305 to step S309 are repeated until the KSW1 is turned on. When the KSW1 is turned on, the flow goes to step S310. In step S310, the lens drive abnormality designation is released. That is, when the processing in step S310 is executed, the photographing lens 7 is regarded as reaching the target position (collapsed position) so that the abnormality designation set previously is canceled. In step S311, it is designated that the photographing lens 7 has reached the collapsed position (a flag is set). The motor 4 is stopped in step S312. The motor is braked for 50 mS in step S313 and step S314. The brake to the motor 4 is released in step S315, and the flow goes to step S206 (FIG. 2A) by use of "RETURN".

When an abnormality is detected in step S307 and the flow goes to step S316, the drive abnormality of the photographing lens 7 is indicated on the display device 5 in step S316. As a form of the indication, for example, a film counter may be made flicker, or the entire indication on the display device 5 may be made flicker. In step S317, the control by pulse energization is started. If the CPU1 is of the type having a so-called pulse energization output function which is capable of changing an output value for every predetermined time, a pulse energization output is set. If the CPU1 is not of the type having the pulse energization output function, it is set by use of another timer that an output from an output port connected to the lens driving circuit has a high voltage and a low voltage alternately for every predetermined time.

In step S318, it is checked whether the start timer which starts the counting in step S303 reaches the predetermined time or not. If the predetermined time has been elapsed, the flow advances to step S323, and if the predetermined time has not been elapsed, the flow advances to step S319. In step S319, whether the SW1 is turned on or not is checked. If the SW1 is on, the flow goes to step S323, and if it is off, the flow goes to step S320.

In step S320, a state of the KSW1 is checked, and the processings from step S318 to step S320 are repeated until the KSW1 is turned on. When the KSW1 is turned on, the flow advances to step S321. In step S321, the photographing lens 7 is in the collapsed state so that the control by pulse energization is stopped. In step S322, the abnormality display set in step S316 is released and the flow advances to step S310 to return to normal.

If the start time has been elapsed in step S308 or in step S318, or if the switch SW1 for stop designation is operated in step S319, the flow goes to step S323 to execute the following processing.

In step S323, the motor 4 is stopped. If the stop is effected during the pulse energization control, the pulse energization control is stopped. In step S324, the lens drive abnormality is designated (the flag is set). By this designation (setting), a branch destination in step S202 (FIG. 2A) is changed. In step S325, the subroutine is released (it is set not to return the main routine). By this processing, it is prevented that the subroutine remains being called. In step S326, the display device 5 is turned off. In this case, the lens drive abnormality is also cleared off. In step S327, the next start designation which is the same processing as that in step S219 (FIG. 2A) is executed. In step S328, the power-down processing which is the same as that in step S220 (FIG. 2A) is executed. After that, the CPU1 is stopped in the "STOP" step. It is when the condition designated in step S326 is created that the next start is effected. Upon creation of the condition, the processing is resumed by use of the "start" (FIG. 2A). Note that the designation of the next start is effected in response to the fact that the SW1 is turned on and the processing is resumed from the "start" in FIG. 2A. The resumed processing goes to step S201, to step S202, and then to step S205 (because the lens drive is abnormal) so as to return to the lens collapse drive.

FIGS. 4A and 4B are flow charts showing the lens extension drive (step S207) routine. Description of FIGS. 4A and 4B will be omitted since FIGS. 4A and 4B are different from FIGS. 3A and 3B only in that the "lens collapse" is changed into the "lens extension". The "motor reverse rotation" into "motor forward rotation", and the check on the "KSW1" into that on "KSW2".

In the above embodiment the description was made using the drive control of the photographing lens 7. However, there is another embodiment in which a barrier 8 for protecting the photographing lens is used as the member to be driven, as indicated by a dotted line in FIG. 1. In still another embodiment, a processing for closing the barrier is inserted after the processing in step S205 and a processing for opening the barrier is inserted before the processing in step S207 so that both the barrier 8 and the photographing lens 7 can be controlled.

According to the embodiments described above, the electric power is supplied to the motor driving means by two energization methods, that is, the full energization and the pulse energization, so that an energization method is switched to the pulse energization when the lens or barrier drive abnormal state is detected. Further, it is arranged to continuously detect the lens or barrier shift even after a start of the control by the pulse energization. In addition, the motor is stopped by detecting that the lens or the barrier does not reach the target position even when the predetermined time has been elapsed.

In step S307 or step S407, when the lens or barrier drive abnormal state is detected, the control is switched to the pulse energization control in step S316 or step S416 so that a load due to the drive is decreased, whereby it is possible to continue the drive of the driving member while preventing damage of the driving mechanism or damage by a fire of the driving circuit. Since the lens shift is continuously detected in step S320 or step S420 after the start of the pulse energization control, the flow goes to step S310 or step S410 so that a desired operation can be continued if the lens reaches the target position even after the abnormality was detected.

Further, in step S308 or step S318, or in step S408 or step S418, the consumption of the battery power can be suppressed even when the user is not aware of the outbreak of the abnormality since the control by pulse energization is stopped in step S323 after the predetermined time has been elapsed and the power is turned down in step S328 or step S428.

Arranged in such a manner, since damage of the driving mechanism or damage by a burning of the driving circuit at the time of detection of an abnormal state is prevented, a system failure hardly arises. Also, since the drive of the driving member is continued even if an output of the driving means is decreased, recovery from the failure can be easily attained.

Also, since an output of the driving means is lowered by the pulse energization to the motor driving means, a special circuit for lowering an output of the driving means is no longer required, thereby attaining reduction in cost.

When the SW1 serving as the operating member is operated during the drive in an abnormal state, the drive is stopped. As a result, current consumption can be restrained.

Since the drive control is halted after the predetermined time from the control start, the current consumption can be restrained even when the user is not aware of the abnormality.

The predetermined time up to the halt of the drive control is made the same as the start time which is determined in step S201 so that a consistent setting processing can be executed. When the time is stored as data in the EEPROM, a storing space of data can be reduced.

Since the operating member which normally has a different function is provided with the function of stopping the drive in the abnormal state, system parts can be saved and the cost can be reduced.

Since the operating member for halting an abnormal drive and the operating member for return are the same, system parts can be saved and the cost can be reduced.

As described above, according to the electric camera of the present invention, when an abnormal state of the lens or barrier drive is detected, the control is switched to the drive control by pulse energization so that a load due to the drive is lowered. As a result, it is possible to continue the drive of the driving member while preventing damage of the driving mechanism or damage by a burning of the driving circuit. Since the lens shift is detected continuously after the start of the control by pulse energization, the lens is shifted even after the detection of an abnormal state, and if the lens is shifted and reaches the target position, a desired operation can be executed continuously.

Further, after the predetermined time has been elapsed from the outbreak of abnormality, the control by pulse energization is halted to turn the power down so that a power consumption of a battery can be saved even when the user is not aware of the outbreak of abnormality.

What is claimed is:

1. A camera comprising:

driving means for driving a photographing lens;

detection means for detecting a drive abnormality of said photographing lens;

control means for controlling said driving means in such a manner that the drive force of said photographing lens is decreased in response to a detection of the drive abnormality by said detection means; and timer means for starting counting in response to a start of the drive of the photographing lens, wherein said control means controls said driving means in such a manner that the drive of said photographing lens is stopped in response to an indication of a predetermined time by said timer means.

2. An electric camera comprising:

a switch for performing a switching operation of the camera between a use position at which the camera is usable and a not-use position at which the camera becomes in a pause state;

a driving member for shifting a member to be driven between a use position at which the member is usable and a pause position at which the member is not used at a first driving speed in response to a switched state of said switch;

detection means for detecting whether the shift of said member to be driven is abnormal or not;

counter means for starting counting when said driving member starts a driving operating in response to the switching operation by said switch;

a change-over member for changing over a driving speed of said driving member from a first speed to a second speed which is lower than the first speed in response to a detection by said detection means that the shift of said member to be driven is abnormal; and control means for stopping the drive of the driving member when the counter means counts the predetermined time.

3. An electric camera according to claim 2, wherein:

said driving member is adapted to generate a driving force when electric power is supplied from a power source via said control means;

said driving means drives said member to be driven at said first speed when a constant first electric power is supplied; and said driving member drives said member to be driven at said second speed when said first electric power and a second electric power which is lower than said first electric power are supplied alternately.

4. An electric camera according to claim 2, further comprising:

at least one operating member, wherein said control means stops the drive of said driving means when said operating member is operated after said change-over member changes over the driving speed of said driving member to said second speed in response to the detection by said detection means that the shift of said member to be driven is abnormal.

5. An electric camera according to claim 2, further comprising:

at least one operating member for selectively operating a normal function of the camera; and display means for giving a display, after said operating member is operated and the selected normal function is effected, in response to said operation for a predetermined time, wherein the time of display by said display means is the same as the predetermined time counted by said counter means.

6. An electric camera according to claim 2, further comprising:

at least one operating member, wherein said control means resumes the control to drive said member to be driven in accordance with the position of said switch in response to the operation of said operating member after the control on said driving member is changed in response to the detection by said detection means that the shift of said member to be driven is abnormal.

7. An electric camera according to claim 4, wherein said operating member for stopping the drive of said driving member after the detection by said detection means that the shift of said member to be driven is abnormal and the operating member for returning the control of said driving member are one and the same.

8. An electric camera according to claim 6, wherein said operating member for stopping the drive of said driving member after the detection by said detection means that the shift of said member to be driven is abnormal and the operating member for returning the control of said driving member are one and the same.

9. An electric camera according to claim 4, wherein said operating member is the switch.

10. An electric camera according to claim 6, wherein said operating member is the switch.

11. An electric camera according to claim 2, wherein:
said member to be driven is a photographing lens; and
said pause position is a position at which said photographing lens is housed in the camera; and
said use position is a position at which said photographing lens is extended.

12. An electric camera according to claim 2, wherein:
said member to be driven is a barrier for protecting a photographing lens;
said pause position is a position for said barrier to cover said photographing lens; and
said use position is a position for said barrier to retract from the photographing lens.

13. An electric camera according to claim 2, wherein:
said member to be driven includes a photographing lens and a barrier for protecting said photographing lens;
said pause position is a position at which said photographing lens is housed in the camera and said barrier covers said photographing lens; and
said use position is a position at which said photographing lens is extended and said cover retracts from the photographing lens.

14. An electric camera according to claim 2, wherein said detection means detects that the shift of said member to be driven is abnormal when said driving member stops the drive for the predetermined time.

15. An electric camera according to claim 2, wherein said detection means detects that the shift of said member to be driven is abnormal when said member to be driven stops to be driven for the predetermined time.

16. An electric camera according to claim 4, wherein said operating member is normally a switch for controlling the camera.

17. An electric camera according to claim 5, wherein said operating member is normally a switch for controlling the camera.

18. An electric camera according to claim 6, wherein said operating member is normally a switch for controlling the camera.

19. An electric camera according to claim 2, further comprising display means for indicating that the shift of said member to be driven is abnormal in response to the detection of the abnormality by said detection means.

* * * * *